July 2, 1946.  S. KAESZ  2,403,223

EYESHIELD FOR GLASSES

Filed July 20, 1944  2 Sheets-Sheet 1

INVENTOR.
Stefan Kaesz
BY
PATENT AGENT

July 2, 1946.　　　　S. KAESZ　　　　2,403,223
EYESHIELD FOR GLASSES
Filed July 20, 1944　　　　2 Sheets-Sheet 2

INVENTOR.
Stefan Kaesz
BY
PATENT AGENT

Patented July 2, 1946

2,403,223

UNITED STATES PATENT OFFICE 2,403,223

EYESHIELD FOR GLASSES

Stefan Kaesz, Brooklyn, N. Y.

Application July 20, 1944, Serial No. 545,816

3 Claims. (Cl. 2—13)

This invention relates in general to an eye shield for glasses of improved construction which may be detachably secured to the usual eyeglasses having lenses particularly adapted for the wearer.

The main object of the invention is to attach the eye shields to the glasses, and to the rim of the glasses in particular, without weakening the rim.

The eye shields have been secured to the rim by a pin or rivet, the latter only holding the shield adjacent to the rim.

A further object of the invention is to provide greater security in the attachment of the eye shield to the rim by forming a slot in the widened rim in which the ends of the eye shield are inserted and secured in the inserted position by screws or the like in order to remove the shields if not needed.

Other objects of my invention will become apparent in the following detailed specification and three embodiments of the invention appear illustrated in the accompanying drawings.

Figure 1 of the drawings is a perspective view of the eyeglasses having the improved shields applied thereto, the end of the shield being inserted in closed slots of the frame;

Figure 1:
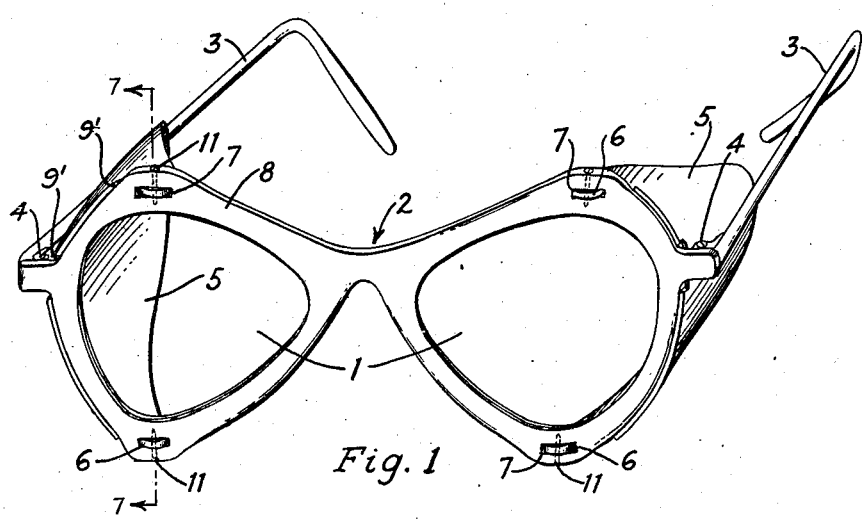
Figure 2:
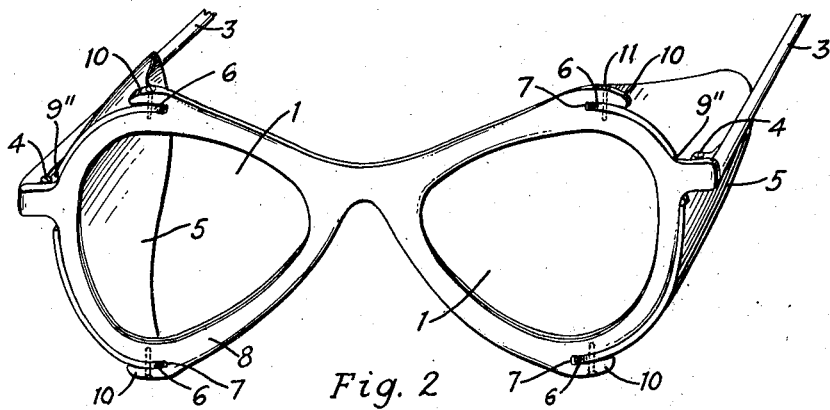
Fig. 2 is again a perspective view of the eyeglasses having the improved shields applied thereto, the ends of the shields being inserted in short open slots of the frame.
Figure 3:
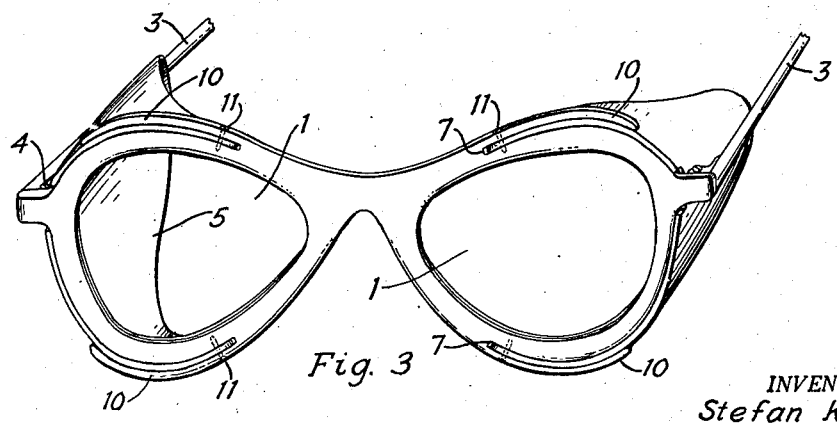
Fig. 3 is also a perspective view of the eyeglasses having the improved shields applied thereto, the ends of the shields being inserted in long open slots extending along the periphery of the frame.
Figure 4:
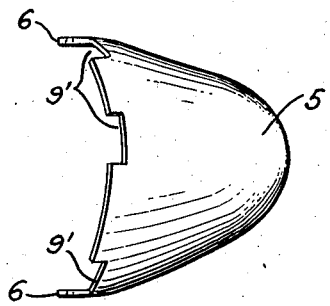
Figure 5:
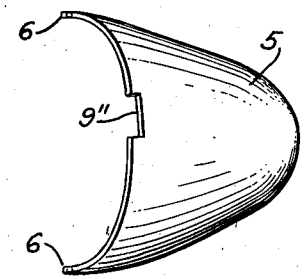
Figure 6:
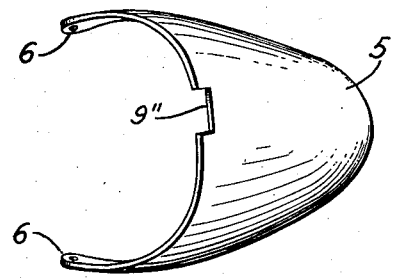
Figure 7:
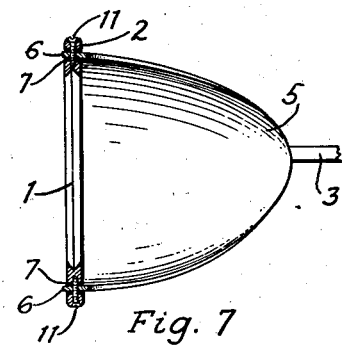

Figs. 4, 5, and 6 show perspective views of the shields to be used for the embodiments of the invention shown in Figs. 1, 2 and 3, respectively;

Fig. 7 shows a transverse section along the line 7—7 of Fig. 1; and

Figure 8:
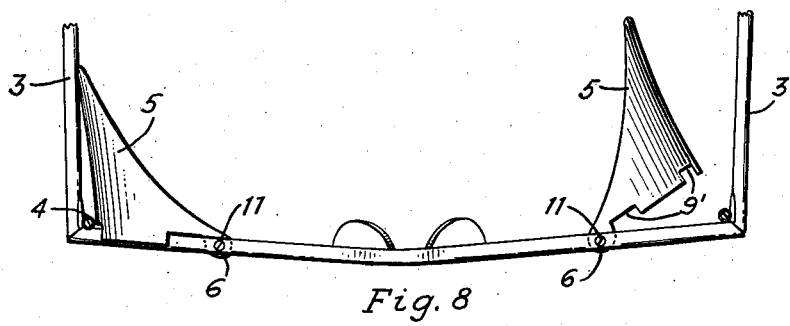

Fig. 8 is a top edge view of the eyeglasses having the eye shields attached to it and the bows being partly cut off.

The invention is shown applied to a pair of eyeglasses of ordinary type comprising the lenses 1, the frame 2 and ear pieces or bows 3; the latter being hinged to the usual hinge parts 4.

A separate shield for each lense is provided and each shield comprises a semi-annular member 5 adapted to surround the outer sides of the lenses 1. The inwardly extending ends 6 of the member 5 are inserted in slots 7 arranged on the rim 8 of the frame 2. The upper and lower part of the rim 8 is equipped with such slots 7 and the ends 6 of the member 5 are inserted into that upper and lower slot 7, respectively.

According to the construction shown in Fig. 1 the rim 8 is widened on its upper and lower parts and slots 7 are cut into the widened parts of the rim 8 which receive the respective ends of the member 5. This is a preferred embodiment of the invention whereby the slots can be cut shorter or longer depending for what purpose the eyeglasses are used. For military purposes the rim 8 will be provided with a longer slot in order to secure firmly the shields in their operating position. In order to fit the eye shield to the outer rim of the frame the front end of the shield 5 is provided with at least three notches 9', namely two near their ends from the slot 7 to the outer face of the rim 8, and one in the center to embrace the hinge member for the bows 3.

The construction shown in Figs. 2 and 3 has also a widened rim 8, but the slots 7, receiving the ends of the shield member 5, are open. This construction with open slots 7 will not be as rigid as that shown in Fig. 1, but will be sufficiently strong for several purposes. In Fig. 2 the rim 8 has a short open slot 7 whereas in Fig. 3 a long open slot 7 is arranged by providing a long arm 10 integrally extending from and adjacent to the rim 8. In this construction one notch 9" in the center of the forward end of the shield member 5 is necessary, which notch 9" embraces the hinge member of the bow 3.

The shield members 5 are inserted into the slots 7 of the frame 2 and secured either by rivets or, preferably, by screws 11 which allow the easy removal of the shields 5 when it is preferred to use just ordinary glasses without shields. The invention provides an eyeglass frame which can be used for ordinary glasses and easily can be transformed into eyeglasses with shield members.

It is to be understood that the invention can also be used for rimless eyeglasses in which case the used word "rim" is meant in the sense that the slot arm 10 extending adjacent to the lens is formed integrally with that narrow part of the frame which is fixed to the lens.

The side shields used heretofore have been merely riveted to the rim of the glasses thereby weakening the latter and furthermore the shield broke out very often from the rivet. According to the present invention the shields are inserted in the slot and held in position by the slot and merely secured in the position by a rivet or preferably a screw. Thus the shield can be placed tightly to the frame of the glasses and assures protection against light coming in from the sides, The present invention provides a stronger and quite more practical connection of the side shield with the eyeglasses, thus avoiding the breaking-off of the shields.

It is obvious that various changes and modifications may be made to the details of construction without departing from the spirit of the invention as defined in the claims.

I claim:

1. The combination with a pair of eyeglasses, of an eye shield, the rim of said eyeglasses having an upper and lower circumferential slot, a part of said eye shield being inserted into said slot and said inserted part of said eye shield being pivoted within the said slot to the said rim of the eyeglasses.

2. The combination with a pair of eyeglasses, of an eye shield, an upper and lower widened part of the rim of said eyeglasses having circumferential closed slots, a part of said eye shield being inserted into said closed slot and said inserted part of said eye shield being pivoted within the said slot to the said rim of the eyeglasses.

3. The combination with a pair of eyeglasses of an eye shield, upper and lower arms extending integrally from and adjacent to the rim of said eyeglasses forming circumferential open slots of a length to receive at least a part of said eye shield and said inserted part of said eye shield being pivoted within the said slot to the said rim of the eyeglasses.

STEFAN KAESZ.